United States Patent [19]

Isoe et al.

[11] Patent Number: 5,683,091
[45] Date of Patent: Nov. 4, 1997

[54] SPIRAL WOUND GASKET WITH AT LEAST FIVE INNER AND OUTER PLIES SECURED BY AT LEAST FOUR WELDS

[75] Inventors: Takahito Isoe, Tokyo; Kanji Hanashima, Yokohama; Katsumi Watanabe, Yokohama; Takashi Nemoto, Yokohama, all of Japan

[73] Assignee: Nichias Corporation, Tokyo, Japan

[21] Appl. No.: 677,089

[22] Filed: Jul. 9, 1996

[30] Foreign Application Priority Data

| Jul. 10, 1995 | [JP] | Japan | 7-197022 |
| Aug. 25, 1995 | [JP] | Japan | 7-240542 |
| Aug. 31, 1995 | [JP] | Japan | 7-246678 |

[51] Int. Cl.[6] .................................................. F16J 15/12
[52] U.S. Cl. .................................................... 277/204
[58] Field of Search ............................. 277/203, 204, 277/11, 235 R, 180

[56] References Cited

U.S. PATENT DOCUMENTS

| 3,336,035 | 8/1967 | Price | 277/235 R |
| 4,116,451 | 9/1978 | Nixon et al. | 277/235 R |
| 4,629,199 | 12/1986 | Yamamoto et al. | 277/204 |
| 5,275,423 | 1/1994 | Allen et al. | 277/235 R |
| 5,308,090 | 5/1994 | Hanada et al. | 277/11 |
| 5,527,047 | 6/1996 | Waterland, III | 277/235 R |

FOREIGN PATENT DOCUMENTS

| A177660 | 8/1991 | Japan | 277/204 |

*Primary Examiner*—Scott Cummings
*Attorney, Agent, or Firm*—Flynn, Thiel, Boutell & Tanis, P.C.

[57] ABSTRACT

In order to obtain an extremely good gas sealing property, in a spiral gasket, in which a metal hoop material and a filler material formed approximately in a V-shape in the cross-section are wound in a spiral, superposed on each other, only the hoop material is wound in a spiral without filler material by at least 5 turns at each of the beginning of winding on the inner side and the end of winding on the outer side. In this case there are disposed at least 4 portions fixed by welding at each of the beginning and the end of winding at positions, where the inner periphery and the outer periphery are divided with equal intervals on the inner and the outer side of the gasket body, respectively.

11 Claims, 6 Drawing Sheets

SPIRAL WOUND GASKET WITH AT LEAST FIVE INNER AND OUTER PLIES SECURED BY AT LEAST FOUR WELDS

FIELD OF THE INVENTION

The present invention relates to an improvement of a spiral wound gasket used in a high temperature high pressure machine and a joint of pipes therefor for sealing fluid such as water, oil, vapor, gas, etc.

DESCRIPTION OF THE PRIOR ART

Figure 5:
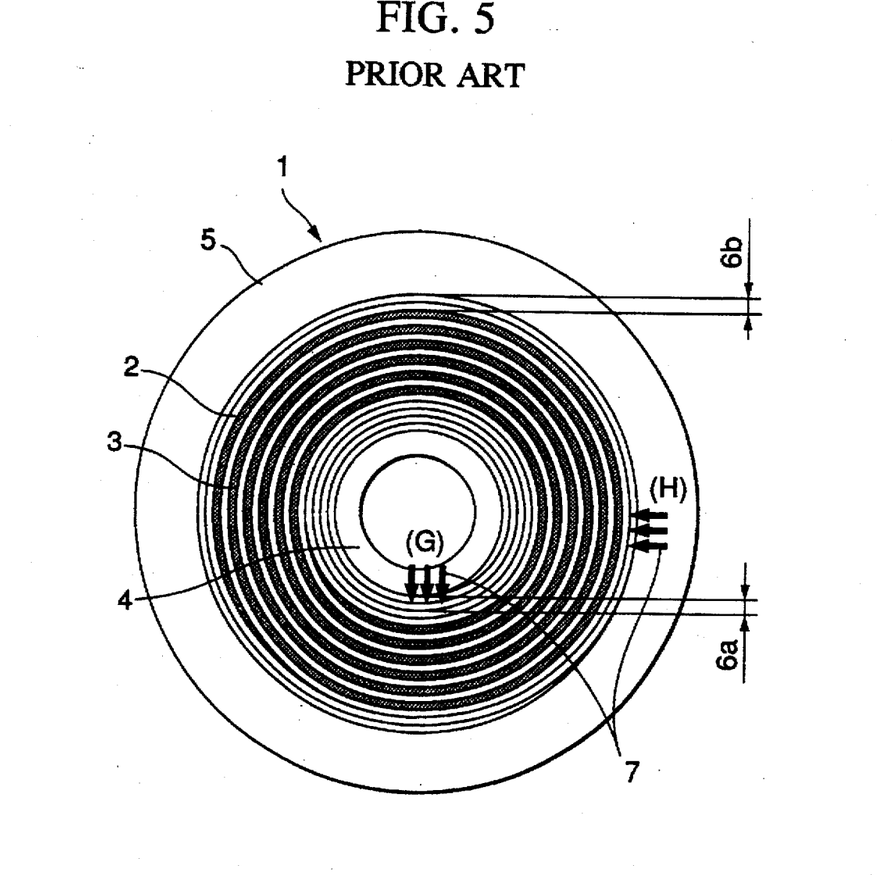
FIG. 5 is a plan view of a prior art spiral gasket.
Figure 6:
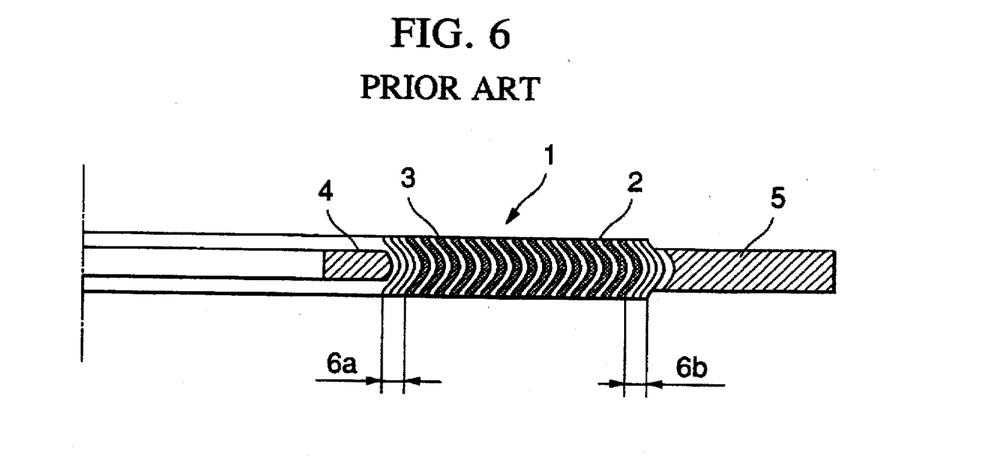
FIG. 6 is a partial cross-sectional view of the spiral gasket indicated in FIG. 6.

FIGS. 5 and 6 show a prior art representative spiral gasket.

In the figures, reference numeral 1 indicates a spiral gasket body; 2 a hoop material made of a metal, thin plate strip in the winding having an approximately V-shaped waveform in cross-section; 3 a filler material made of asbestos paper, inorganic paper other than asbestos, for example flexible graphite, etc.; 4 an inner ring; 5 an outer ring; 6a the inner winding plies of the hoop material without filler material and 6b the outer winding plies of the hoop material without filler material.

For fabricating the spiral gasket body 1 constructed as described above, at first a hoop material 2 is wound on a winding die (not indicated in the figures). The initial plies of the hoop material superposed on each other by this winding are welded by spot welding at about three positions so as to form three portions fixed by welding (G) close to each other only on one side. After having wound only the hoop material thereon by about two plies without filler material, positioning filler material 3 therebetween, the hoop material and the filler material are wound, superposed on each other. At the end of the winding, only the hoop material is wound by about three plies without filler material. At last the end portion of the winding is welded by spot welding at about three positions so as to form three portions fixed by welding (H) close to each other only on one side. Spiral gasket bodies are fabricated usually by this method and it is thought that this is the basic form of the spiral gasket body.

The number of turns, in which the hoop material and the filler material are wound, superposed on each other, is strongly influenced by size. It is about three for a small size having a nominal diameter of NPS½ (nominal pipe size) and it can be greater than 15 for a great size having a nominal diameter of NPS24. There are known different types other than the basic form, such as a type having an inner ring, in which a metal reinforcing ring is attached on the inner side of the gasket body for preventing inward deformation of the gasket by clamping pressure, a type having an outer ring, in which a metal reinforcing ring is attached on the outer side of the gasket body for the purpose of preventing outward deformation of the gasket body or centering, types having inner and outer rings, etc., and they are widely utilized in general as gaskets for high temperature and high pressure.

As a kind of the filler material, heretofore asbestos tapes fabricated by slitting asbestos paper into a band shape have been used usually and PTFE tapes not yet baked have been used in utilization fields where corrosion resistance to acid, alkali, etc. is required. However, since asbestos fiber is a natural mineral, exhaustion of which as a resource is feared, and health disorder, which is presumably caused by asbestos fiber, gives rise to a social problem, because of which there is a tendency that utilization of asbestos is restricted all over the world, at the present time tapes obtained by slitting non-asbestos paper principally made of inorganic fiber other than asbestos (hereinbelow abbreviated to NA tapes) are used. Further, under an extremely low temperature condition or in a utilization field where a specifically high sealing property is required, flexible graphite tapes having both suppleness and elasticity flexible graphite tapes, hereinbelow abbreviated to GR tapes) are used.

Since the spiral gasket indicated in FIGS. 5 and 6 has a structure, in which a metal hoop material having an approximately V-shaped cross-section and a filler material having a cushiony property are alternately superposed and wound, it is thought that it has a good sealing property and it is one of ideal gaskets, because it is rich in elasticity and it can also deal with thermal expansion and contraction. In particular, since a gasket, in which a GR tape is used as a filler material, has a good fitness to a flange and it can prevent leaks along a contact surface to a low level, it is known as a gasket having a good gas sealing property in an oxidizing atmosphere below 450° C. or a non-oxidizing atmosphere below 800° C.

However even a spiral gasket using a GR tape as a filler material cannot seal gas completely, Nitrogen gas, etc. are used often at completion examination for a plant, etc. and leak can be produced at that time, which gives rise to a problem.

For this reason, a method, in which organic binder, etc. are applied to the whole surface of the filler material or a part thereof, or another method, in which an auxiliary filler is used, is proposed in order to improve the sealing property. However the sealing property of a gasket using an organic material is suspectable at high temperatures and also it gives rise to a problem that it lowers considerably productivity.

In addition, as represented recently by Clean Air Act (CAA)in U.S., there is a movement to regulate even slight leaks as a part of environment problems and further at the present situation a spiral gasket having a better gas sealing property is required.

SUMMARY OF THE INVENTION

A spiral gasket formed by winding a metal hoop material and a filler material in a spiral, superposed on each other, according to the present invention, is characterized in that only the metal hoop material is wound by at least five plies at the beginning of winding on the inner side and/or at the end of winding on the outer side without filler material at the beginning and the end of winding.

According to the present invention it is preferable that portions fixed by welding at the beginning and the end of winding are disposed respectively at least 4 positions dividing each of the inner and/or the outer periphery of a gasket body with an equal interval.

In this case the number of plies of the wound hoop material only is influenced also by the size of the gasket, but at least five plies are necessary therefor. They may be about ten plies for a large size having a diameter greater than NPS20.

The portions fixed by welding of the hoop material are disposed at positions dividing a circular periphery into equal intervals. For example, in case where the circular periphery is divided by n, welding is effected at positions, adjacent two of which make an angle of 360°/n at the center. At this time errors should be smaller than 10°. It is preferable to divide the circular periphery so that the interval between two adjacent portions fixed by welding is smaller than 100 mm. The number of portions fixed by welding is also influenced by the size of the gasket. Even for a small size at least four portions fixed by welding are necessary. For a large size having a great diameter there is no problem, even if the number exceeds twenty.

As the type of the filler material, it is preferable to use GR tapes so that the gas sealing property is significantly improved thereby. However it is verified that the sealing property is improved also by other fillers. Any type of the gasket in the form can improve the sealing property. However it is verified that a remarkable effect can be obtained particularly by the type having an inner and an outer ring and that a perfect gas seal can be obtained therewith.

It is presumed that the mechanism improving significantly the sealing property of the spiral gasket is based on the following functions.

Since it is considered seriously for a prior art spiral gasket to prevent a leak along the contact surface with a flange by the end surfaces of the filler material, the number of winding plies without filler material of the metal hoop material is as small as 2 to 3. Further, since portions fixed by welding are disposed so that the hoop material does not get loose, usually spot welding is effected at 3 positions with a relatively short interval (shorter than 20 mm). In particular, since buckling of the hoop takes place inwards or outwards only with a small probability for the type having an inner and an outer ring, there are spiral gaskets of this type, in which the number of turns of winding plies without filler is 1 or 2.

There is no problem, when a prior art spiral gasket seals fluid such water and oil, but it cannot seal perfectly gas-like fluid.

This is because, when a gasket is set between two flanges and then clamped, the hoop material and the filler material are compressed and a force, which decreases the vertex angle of the approximate V-shape in the cross-section, is applied thereto and at the same time a force acts also in the normal direction on the hoop material and the filler material, which force deforms the gasket body so as to decrease the inner diameter and to increase the outer diameter. When clamping surface pressure increases further, buckling takes place inwards or the gasket is considerably deformed outwards, which gives rise to a problem. However, even for a suitable surface pressure, it is not possible to completely prevent deformation of the gasket body. This is valid also for a gasket body having an inner and an outer ring. Although the inner and the outer rings have an effect for preventing buckling or other large deformation, since it is impossible to eliminate completely gaps between the body and the inner and the outer rings, it is not possible to prevent slight deformation. In addition, since such deformation takes place rarely uniformly along the circular periphery, this gives rise to fluctuations in the surface pressure of the gasket along the circular periphery. It is believed that this causes a slight leak of gas.

As the result of studies, which the inventors of the present invention have ardently effected on the above described problem, they have found that it is possible to suppress non-uniform deformation along the circular periphery produced in the hoop material and the filler material by disposing at least five plies in each of the beginning of winding on the inner side and the end of winding on the outer side, where only the hoop material is wound in a spiral and by disposing at least four portions fixed by welding in each of the beginning and the end of winding, which portions divide the circular peripheries on the inner and/or outer side of the gasket body with equal intervals. In this way, fluctuations in the surface pressure when it is clamped between two flanges in reality are kept small, which improves the gas sealing property.

DESCRIPTION OF THE PREFERRED EMBODIMENTS

Now several embodiments of the present invention will be explained, referring to the drawings, together with some examples for comparison.

EMBODIMENT 1

Figure 1:
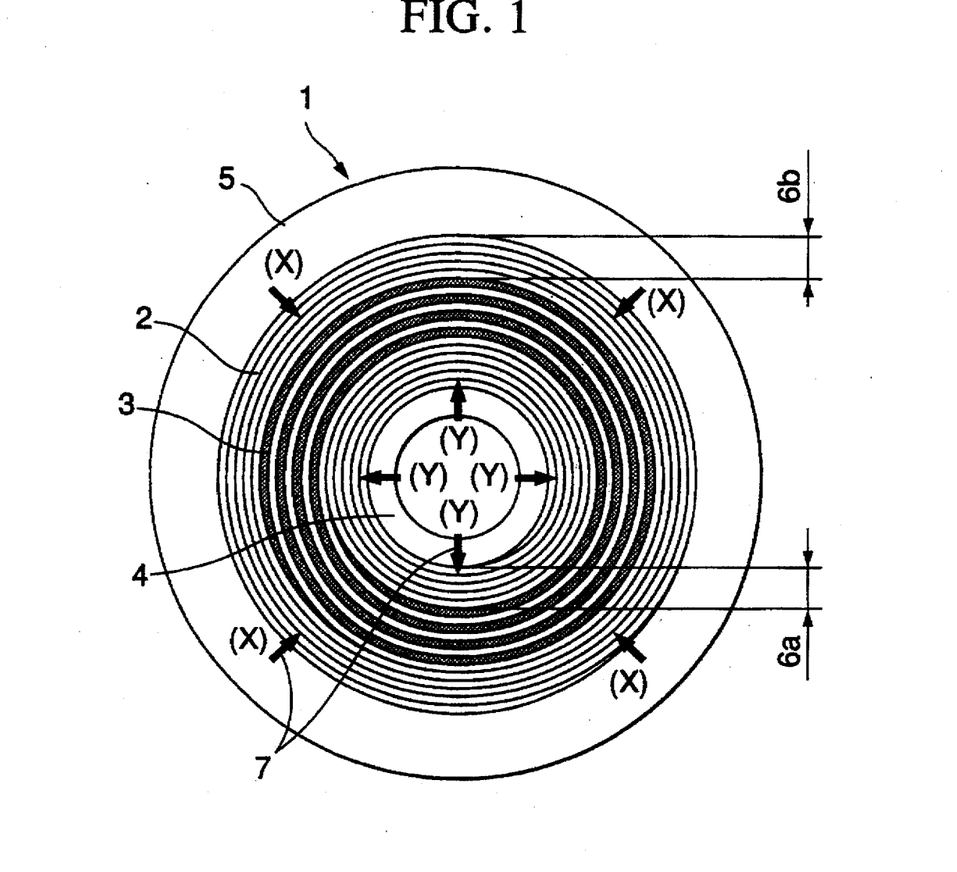
FIG. 1 is a plan view of a spiral gasket, which is an embodiment of the present invention.
Figure 2:
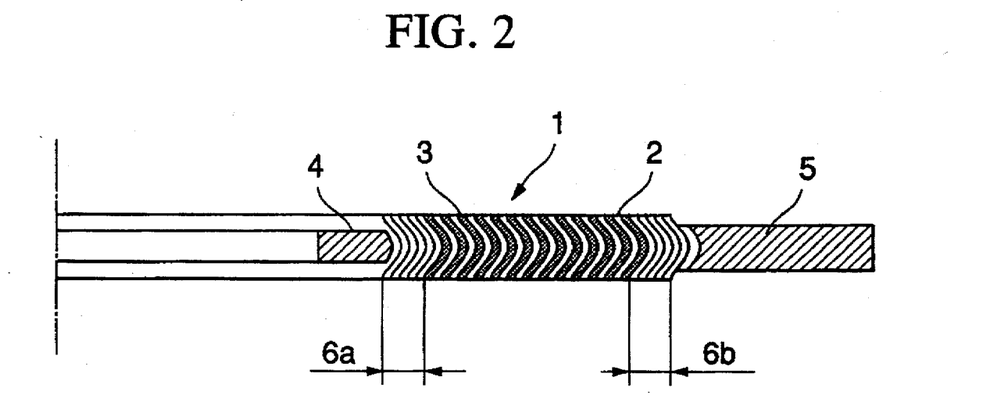
FIG. 2 is a partial cross-sectional view of the spiral gasket indicated in FIG. 1.

EMBODIMENT 1 relates to a spiral gasket indicated in FIGS. 1 and 2. It is a gasket of type with an inner ring and an outer ring, having a size of NPS4, in which GR tape is used for the filler material.

In the figures, reference numeral 1 is a gasket body; 2 is a metal hoop material; 3 is a filler material; 4 is an inner ring; 5 is an outer ring; 6a is a portion of the winding plies without filler material (idle winding) at the inner periphery of the hoop material; and 6b is a portion of the winding plies without filler material (idle winding) at the outer periphery of the hoop material.

By the fabrication method of this gasket, at first, the hoop material made of stainless steel SUS 304 is worked by dishing or shaping into approximately a V-shape in the cross-section is set on a winding die. After having wound only the hoop material by two plies, four portions fixed by welding (Y) are disposed by spot welding at such positions that an angle made by two adjacent positions at the center is about 90° (divided by four). After having wound it further thereon by three plies without filler material, the filler, which is a GR tape, is put between adjacent plies of the hoop. They are wound by 11 to 13 plies, superposed on each other. Thereafter only the hoop material is wound again by five plies without filler material, and lastly four portions fixed by welding (X) are disposed by spot welding at such positions that an angle made by two adjacent positions at the center is about 90° (divided by four) similarly to the beginning of winding. After having dismounted the gasket body from the winding die, the inner ring 4 and the outer ring 5 made of SUS 304 are mounted thereon to complete the gasket.

EMBODIMENT 2

Figure 3:
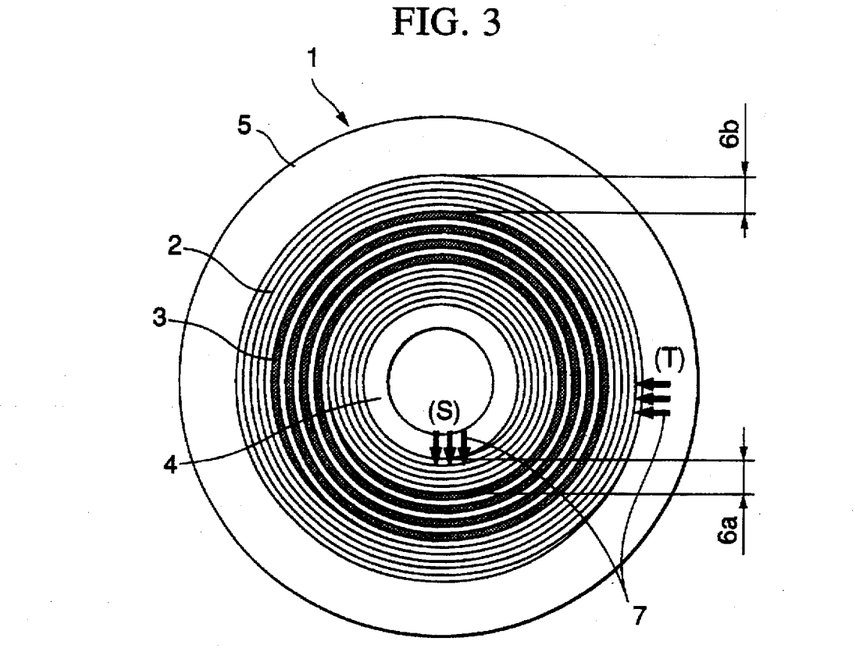
FIG. 3 is a plan view of a spiral gasket, which is another embodiment of the present invention.

EMBODIMENT 2 relates to a spiral gasket indicated in FIG. 3, in which the portions fixed by welding (S) and (T) for the portions of winding plies without filler at the inner periphery 6a and the portions of winding plies without filler at the outer periphery 6b in EMBODIMENT 1 are changed into usual three positions for each potion of winding plies without filler which are close to each other only on one side.

EMBODIMENT 3

Figure 4:
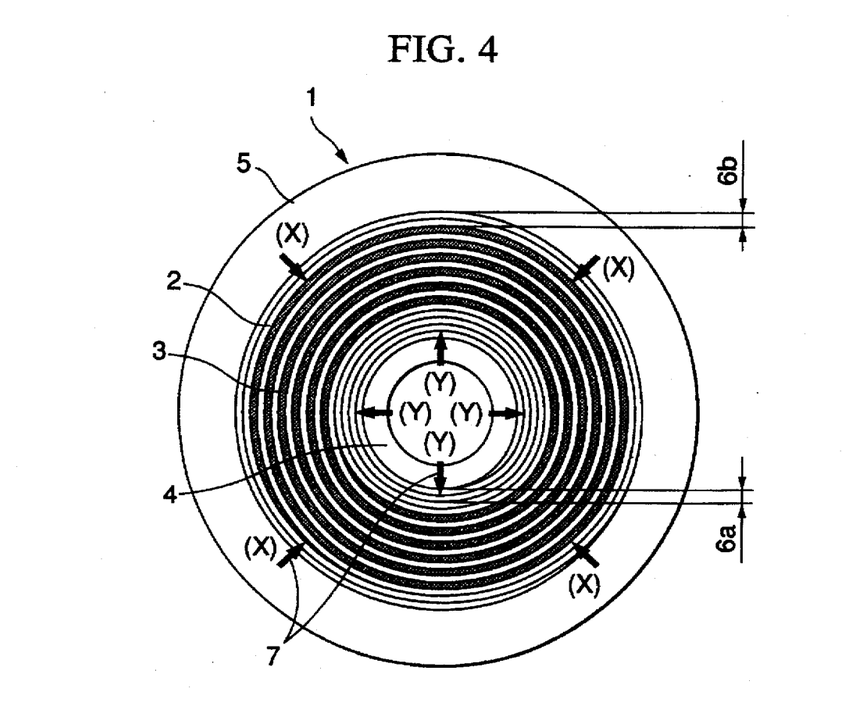
FIG. 4 is a plan view of a spiral gasket, which is still another embodiment of the present invention.

EMBODIMENT 3 relates to a spiral gasket indicated in FIG. 4, in which the number of turns at the beginning and the end of winding of the hoop material at the inner and the outer periphery 6a and 6b, respectively, in EMBODIMENT 1 is changed into the usual three plies.

EXAMPLE FOR COMPARISON 1

This EXAMPLE FOR COMPARISON relates to the prior art spiral gasket indicated in FIGS. 5 and 6, in which the number of turns at the beginning and the end of winding of the hoop material at the inner and the outer periphery 6a and 6b, respectively, is three and there are disposed three portions fixed by welding (G), (H) only on one side for each portion of windings without filler material.

The structure and results obtained of the sealing property are indicated in TABLE 1. Here the sealing property is represented by the quantity of gas obtained by collecting leak by the sinking in water method in one hour, when real NPS4 flanges are used and a He gas pressure of 42-0 $kgf/cm^2$ is applied thereto.

TABLE 1

| | EMBO-DIMENT 1 | EMBO-DIMENT 2 | EMBO-DIMENT 3 | EXAMPLE FOR COMPARISON 1 |
| --- | --- | --- | --- | --- |
| IDLE WINDING AT INNER PERIPHERY | 5 TURNS | 5 TURNS | 3 TURNS | 3 TURNS |
| IDLE WINDING AT OUTER PERIPHERY | 5 TURNS | 5 TURNS | 3 TURNS | 3 TURNS |
| PORTIONS FIXED BY WELDING AT INNER PERIPHERY | 4 POSITIONS DIVISION BY 4 | 3 POSITIONS 1 SIDE | 4 POSITIONS DIVISION BY 4 | 3 POSITIONS 1 SIDE |
| PORTIONS FIXED BY WELDING AT OUTER PERIPHERY | 4 POSITIONS DIVISION BY 4 | 3 POSITIONS 1 SIDE | 4 POSITIONS DIVISION BY 4 | 3 POSITIONS 1 SIDE |
| SEALING PROPERTY (cc/h) | 0.00 | 0.12 | 0.08 | 0.67 |

As indicated in TABLE the even for EXAMPLE FOR COMPARISON 1, leak amount is small and it cannot be said that the sealing property is bad. However, the leak amount in EMBODIMENTS 2 and 3 is as small as ⅕ with respect to that obtained for EXAMPLE FOR COMPARISON 1, and it is zero for EMBODIMENT 1. Thus it is verified that EMBODIMENTS 1 to 3 are much better than EXAMPLE FOR COMPARISON 1 in the sealing properties thereof.

It is believed that the sealing property is particularly improved in EMBODIMENT 1 by a synergic effect of the fact that the number of turns of winding without filler material at the inner and the outer periphery 6a and 6b, respectively, is five and the fact that the portions of winding without filler material fixed by spot welding (Y) and (X) are disposed at positions dividing the inner and outer peripheries with equal intervals.

There are spiral gaskets as described above, in which the filler material somewhat protrudes from the hoop material. Hereinbelow the mechanism thereof to keep the sealing property will be presumed. In this type of spiral gaskets, the filler protruding from the hoop prevents the hoop from damaging flanges, and further it fills gaps produced on the contact surfaces by scratches or flexing of the flanges owing to a cushiony property of the filler to prevent leak along the contact surfaces of the flanges. However this protruding amount of the filler, which protrudes from the hoop, has not yet been defined.

As the result of studies, which the inventors of the present invention have ardently effected, they have found that if the protruding amount of the filler, which protrudes from the hoop, is too small and insufficient, it is impossible to effectively prevent leaks along the contact surfaces, while if the protruding amount of the filler is too great, although it is possible to prevent leaks along the contact surfaces at the normal temperature, when it is used in an environment which deteriorates the filler such as heating, etc., expanded graphite or organic substance included in the protruding filler is deteriorated and finally disappears, which lowers the clamping pressure of the gasket, and it becomes impossible to prevent leaks along the contact surfaces and thus the sealing property is worsened, and that there is an optimum region of the protruding amount of the filler, which protrudes from the hoop, where the sealing property is good.

That is, it was confirmed that when the protruding amount of the filler, which protrudes from the hoop, is between 0.10 mm and 0.50 mm, the best sealing property can be obtained and that when the protruding amount of the filler is greater or smaller than this region, the sealing property is worsened.

EMBODIMENT 4

Figure 8:
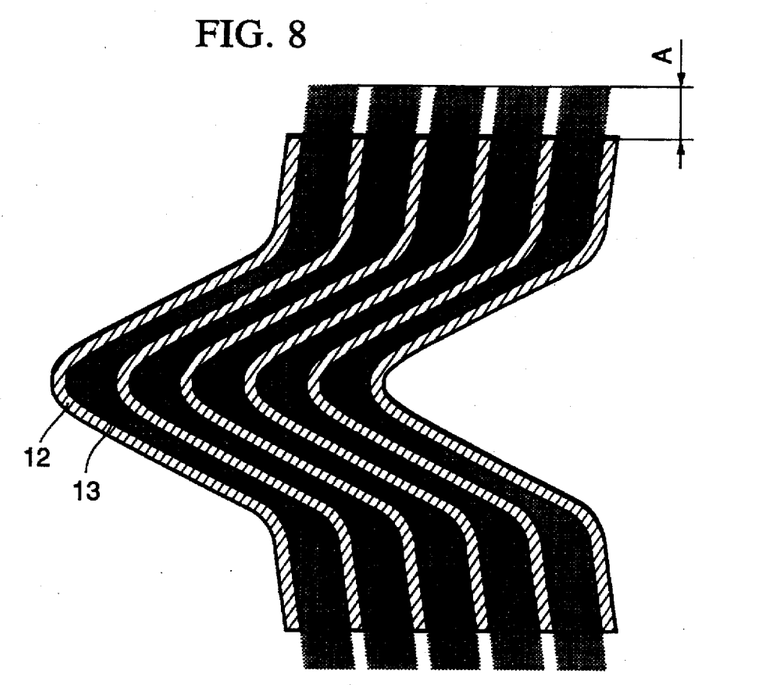
FIG. 8 is an enlarged cross-sectional view of a part, in which a hoop material and a filler material are wound, superposed on each other, of the fourth embodiment of the present invention.

FIG. 4 shows an embodiment of the spiral gasket 11 of type described above according to the present invention and it is a transverse cross-sectional view representing the left half thereof and FIG. 8 is an enlarged view of a part B thereof. In the figures, reference numeral 12 is a hoop made of a tape-shaped metal thin plate, which is worked by dishing or shaping into approximately a V-shape, and 13 is a filler, e.g. made of an expanded graphite, wound together with the hoop 12 in a spiral, superposed on each other, to constitute the gasket 11.

Figure 7:
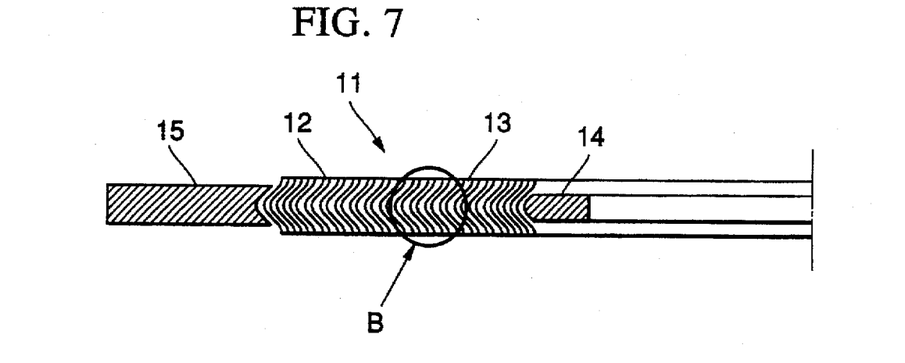
FIG. 7 is a transverse cross-sectional partial view indicating a fourth embodiment of the present invention.

The protruding amount A of the filler protruding from the hoop 12 is 0.24 mm. In FIG. 7, 14 and 15 are an inner and an outer ring, respectively.

EMBODIMENT 5

The protruding amount A of the filler protruding from the hoop 12 is 0.12 mm.

EMBODIMENT 6

The protruding amount A of the filler protruding from the hoop 12 is 0.48 mm.

EXAMPLE FOR COMPARISON 2

EXAMPLE FOR COMPARISON 2 relates to a spiral gasket fabricated in an approximately same manner as EMBODIMENT 4 and the protruding amount of the filler is 0.06 mm.

EXAMPLE FOR COMPARISON 3

EXAMPLE FOR COMPARISON 3 relates to a spiral gasket fabricated in an approximately same manner as EMBODIMENT 4 and the protruding amount of the filler is 0.60 mm.

Results obtained on the sealing property of EMBODIMENTS 4 to 6 and EXAMPLES FOR COMPARISON are summarized in TABLE 2.

Real NPS4 flanges are used in order to measure the sealing property. Gaskets of EMBODIMENTS 4 to 6 and EXAMPLES FOR COMPARISON 2 and 3 are mounted thereon. The sealing property is represented by the quantity of gas obtained by collecting leak by the sinking in water method in one hour for each gasket, when a He gas pressure of 42.0 kgf/cm$^2$ is applied to each gasket at the normal temperature and at the normal temperature but after having kept it once at a temperature of 500° C. in 5 hours.

TABLE 2

|  | EMBO-DIMENT 4 | EMBO-DIMENT 5 | EMBO-DIMENT 6 | EXAMPLE FOR COMPARISON 2 | EXAMPLE FOR COMPARISON 3 |
| --- | --- | --- | --- | --- | --- |
| PROTRUDING AMOUNT (mm) | 0.24 | 0.12 | 0.48 | 0.06 | 0.60 |
| SEALING PROPERTY AT NORMAL TEMPERATURE (cc/h) | 0.10 | 0.15 | 0.10 | 2.40 | 0.15 |
| SEALING PROPERTY AFTER HEATING (cc/h) | 0.08 | 0.10 | 0.20 | 1.67 | 2.65 |

From TABLE 2, it can be known that the leak amount for EXAMPLE FOR COMPARISON 2 is great both at the normal temperature and at the temperature after heating, while for EXAMPLE FOR COMPARISON 3 it can be known that the sealing property after heating is bad, although the sealing property at the normal temperature is as good as that obtained for EMBODIMENTS 4 to 6.

Figure 9:
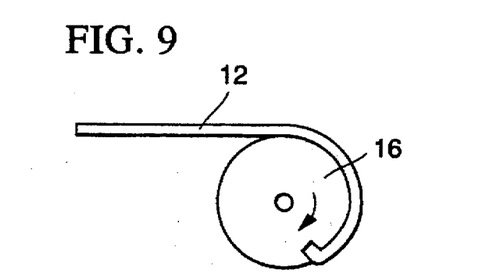
FIG. 9 is a schematical diagram indicating a fabrication method in the fourth embodiment of the present invention.
Figure 10:
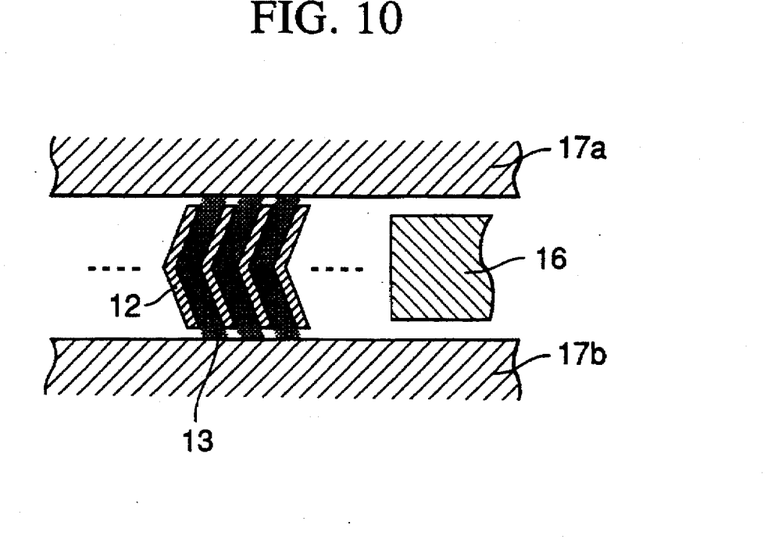
FIG. 10 is a partial schematical diagram indicating the fabrication method in the fourth embodiment.

FIGS. 9 and 10 show an embodiment of the method for fabricating the spiral gasket indicated in FIG. 7 according to the present invention. In the figures, 16 is a rotatable winding die and 17a and 17b are a pair of side plates. At first, the tape-shaped metal thin plate (e.g. made of SUS 304) or ribbon is set on the winding die 16, as indicated in FIG. 9, after having been worked by dishing into approximately a V-shape, and only the hoop material 12 is welded by spot welding after having been wound by one turn. After the hoop material 12 has been wound thereon further by two plies without filler material, the filler material, made of GR tape is put between two adjacent plies of the hoop material and they are wound by 15 to 17 plies, superposed on each other. Thereafter only the hoop material is wound again by three plies without filler material and welded by spot welding.

At this time, in order to set widths of the hoop material 12 and the filler material 13 so that the protruding amount of the filler 13 protruding from the hoop 12 is e.g. 0.24 mm, they are wound by putting them between the side plates 17a and 17b in order that the hoop 12 and the filler 13 are not shifted relative to each other. In this way the filler 13 is shaved by the side plates 17a and 17b and therefore it is possible to adjust the protruding amount of the filler with a high precision.

It seems that it would be sufficient that the width of the filler material is greater than the width of the hoop material in order that the filler protrudes from the hoop. However, in this way the protruding amount of the filler is only adjusted by the widths of the hoop and the filler and was not possible to regulate it into a region between 0.10 mm and 0.50 mm with a high precision.

Figure 11:
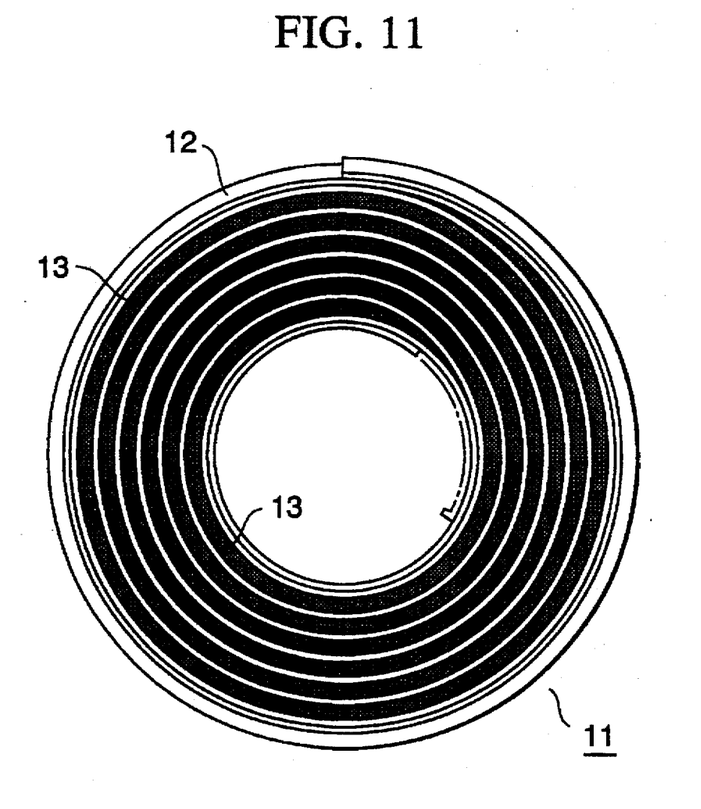
FIG. 11 is a plan view of the gasket in the four embodiment of the present invention.

FIG. 11 indicates the whole construction of the gasket body 11 fabricated by the method described above according to the present invention.

Now, in following embodiments of the present invention, the spiral gasket will be explained, concerning the shape of the vertex of the hoop material.

For a conventional spiral gasket, stress is applied to a point to prevent a leak along contact surfaces with flanges by the end surfaces of the filler material. Therefore, attention is paid to the filler material protruding from the hoop material in the portion where the gasket is in contact with the flanges and no rule is found to define the shape of the vertex of the metal hoop material.

As described previously, there is no problem, when a prior art spiral gasket seals fluids such as water and oil, but it cannot seal perfectly gas-like fluid. The radius of the filler material put between bent parts at the vertex of the V-shape of the hoop material is greater on the outer side than on the inner side. Gaps are produced there more easily, and further force, with which the hoop material pushes the filler material, produced when the gasket is put between two flanges and clamped, is relaxed more easily. It is believed that these cause slight leaks. Consequently, it is believed that the shape of the bent portion at the vertex of the V-shape of the hoop material, that is, mutual effect of the angle and the radius of curvature has a great importance on the gap and the pushing force and influences strongly the sealing property.

As the result of studies, which the inventors of the present invention have ardently effected, they have found that the angle of the bent portion at the vertex of the V-shape of the hoop material and the radius of curvature at the vertex thereof do not influence alone the sealing property, but they have influences thereon, acting on each other, and made clear optimum conditions for combining the angle of the bent portion at the vertex of the V-shape and the radius of curvature at the vertex thereof for improving the sealing property.

That is, according to the present invention, the best sealing property is obtained, when a relation r=0.01 α is valid between the angle α° of the bent portion at the vertex of the V-shape of the hoop material and the radius of curvature mm at the vertex thereof and it is verified that the sealing property is worse both when the radius r is greater than it and when the radius r is smaller than it. However, according to the present invention, taking fluctuations in the fabrication of the gasket and errors at measuring the angle into account, it is supposed that the angle should be in a region of α°±10°.

EMBODIMENT 7

Figure 12:
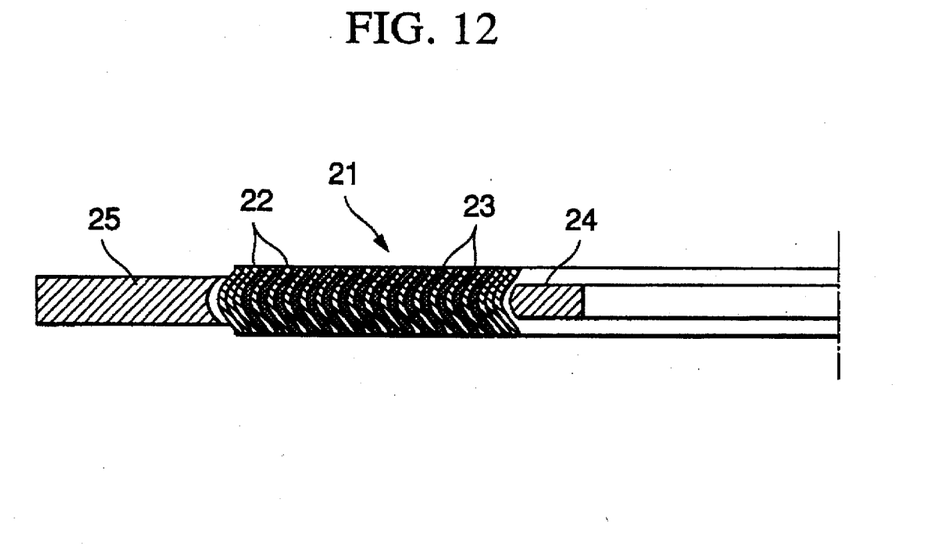
FIG. 12 is a transverse cross-sectional partial view of a spiral gasket showing a seventh embodiment of the present invention.
Figure 13:
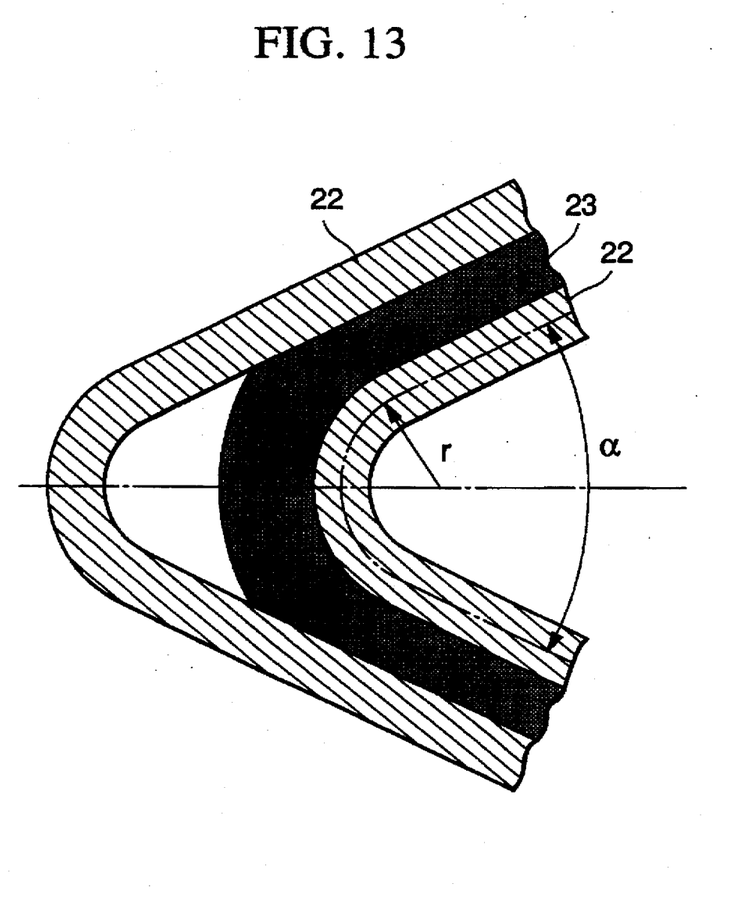
FIG. 13 is an enlarged cross-sectional view of a bent part at the vertex of the V-shape of the hoop material indicated in FIG. 12.

EMBODIMENT 7 is an example, in which the present invention is applied to a spiral gasket with an inner and an outer ring, having a size of NPS4 and a filler material made of GR tape. FIG. 12 is a transverse cross-sectional view of the gasket and FIG. 13 is an enlarged diagram indicating the most important part thereof. In the figures, reference numeral 21 is a gasket body; 22 is a hoop material; 23 is a filler material; 24 is an inner ring; α represents the angle of bending at the vertex of the hoop material; and r indicates a radius of curvature at the vertex.

A method for fabricating the above spiral gasket is as follows. At first, the tape-shaped metal thin plate made of SUS 304 is set on a winding die after having been worked by dishing into approximately a V-shape so that the angle α of the bent part at the vertex of the hoop is 50° and that the radius of curvature r at the vertex is 0.5 mm. Only the hoop material 22 is welded by spot welding after having been wound by one turn. After the hoop material 22 has been wound thereon further by two plies without filler material, the filler material made of GR tape is put between two adjacent turns of the hoop material and they are wound by 15 to 17 plies, superposed on each other. Thereafter only the hoop material is wound again by three plies without filler material and welded by spot welding. At this time the hoop material and the piece thrusting the hoop material are so set that the angle α of the bent part at the vertex is 50° and that the radius of curvature r is 0.5 mm. At last, the inner ring 24 and the outer ring 25 are mounted on the gasket body 21 to complete a gasket, after having dismounted the gasket body thus obtained from the winding die.

EMBODIMENT 8

EMBODIMENT 8 relates to a spiral gasket fabricated in an almost same manner as that fabricated in EMBODIMENT 7, in which the angle α of the bent part at the vertex of the hoop material is changed into 60° and the radius of curvature r is changed into 0.6 mm.

EMBODIMENT 9

EMBODIMENT 9 relates to another spiral gasket fabricated in an almost same manner as that fabricated in EMBODIMENT 7, in which the angle α of the bent part at the vertex of the hoop material is changed into 70° and the radius of curvature r is changed into 0.7 mm.

EXAMPLE FOR COMPARISON 4

EXAMPLE FOR COMPARISON 4 relates to a spiral gasket fabricated in an almost same manner as that fabricated in EMBODIMENT 7, in which the angle α of the bent part at the vertex of the hoop material is changed into 50° and the radius of curvature r is changed into 0.7 mm.

EXAMPLE FOR COMPARISON 5

EXAMPLE FOR COMPARISON 5 relates to another spiral gasket fabricated in an almost same manner as that fabricated in EMBODIMENT 7, in which the angle α of the bent part at the vertex of the hoop material is changed into 70° and the radius of curvature r is changed into 0.7 mm.

The structure of EMBODIMENTS 7 to 9 and EXAMPLES FOR COMPARISON 4 and 5 and results obtained on the sealing property thereof are summarized in TABLE 3. The sealing property is represented by the quantity of gas obtained by collecting leak by the singing in water method in one hour for each gasket, when a He gas pressure of 42.0 kgf/cm$^2$ is applied to each gasket, using real NPS4 flanges.

TABLE 3

| | EMBO-DIMENT 7 | EMBO-DIMENT 8 | EMBO-DIMENT 9 | EXAMPLE FOR COMPARISON 4 | EXAMPLE FOR COMPARISON 5 |
|---|---|---|---|---|---|
| ANGLE α (°) | 50 | 60 | 70 | 50 | 70 |
| RADIUS r (mm) | 0.5 | 0.6 | 0.7 | 0.7 | 0.5 |
| SEALING PROPERTY (cc/h) | 0.00 | 0.04 | 0.09 | 4.03 | 1.88 |

As indicated in TABLE 3, the leak amount is small even for EXAMPLES FOR COMPARISON and it cannot be said that the sealing property is bad. However it was verified that leaking is almost zero for the embodiments and the sealing property is remarkably better than those obtained for the examples for comparison.

TABLE 4 shows the structure and concrete numerical examples of characteristics of EMBODIMENTS 1 to 10 and EXAMPLES FOR COMPARISON 1 to 3.

TABLE 4

| | EMBODIMENT | | | | | | | | | | EXAMPLE FOR COMPARISON | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| IDLE TURNS AT INNER PERIPHERY, BEGINNING OF WINDING (TURN) | 5 | 5 | 3 | 3 | 3 | 3 | 3 | 3 | 3 | 5 | 3 | 3 | 3 |
| IDLE TURNS AT OUTER PERIPHERY, END OF WINDING (TURN) PORTION FIXED BY WELDING AT INNER PERIPHERY | 5 | 5 | 3 | 3 | 3 | 3 | 3 | 3 | 3 | 5 | 3 | 3 | 3 |
| (NUMBER) | 4 | 3 | 4 | 3 | 3 | 3 | 3 | 3 | 3 | 4 | 3 | 3 | 3 |
| (NUMBER OF DIVISIONS) | 4 | 1 | 4 | 1 | 1 | 1 | 1 | 1 | 1 | 4 | 1 | 1 | 1 |
| PORTION FIXED BY WELDING AT OUTER PERIPHERY | | | | | | | | | | | | | |
| (NUMBER) | 4 | 3 | 4 | 3 | 3 | 3 | 3 | 3 | 3 | 4 | 3 | 3 | 3 |
| (NUMBER OF DIVISIONS) | 4 | 1 | 4 | 1 | 1 | 1 | 1 | 1 | 1 | 4 | 1 | 1 | 1 |
| PROTRUDING AMOUNT (mm) | 0.06 | 0.06 | 0.06 | 0.24 | 0.12 | 0.48 | 0.06 | 0.06 | 0.06 | 0.24 | 0.06 | 0.60 | 0.06 |
| ANGLE α (°) | 70 | 70 | 70 | 70 | 70 | 70 | 50 | 60 | 70 | 50 | 70 | 70 | 50 |

TABLE 4-continued

|  | EMBODIMENT | | | | | | | | | | EXAMPLE FOR COMPARISON | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 |
| RADIUS OF CURVATURE r (mm) | 0.5 | 0.5 | 0.5 | 0.5 | 0.5 | 0.5 | 0.5 | 0.6 | 0.7 | 0.5 | 0.5 | 0.5 | 0.7 |
| SEALING PROPERTY AT NORMAL TEMPERATURE (cc/h) | 0.05 | 0.50 | 0.33 | 0.12 | 0.18 | 0.12 | 0.02 | 0.06 | 0.13 | 0.00 | 2.80 | 0.18 | 6.00 |
| SEALING PROPERTY AFTER HEATING (cc/h) | 0.03 | 0.35 | 0.23 | 0.09 | 0.12 | 0.24 | 0.01 | 0.04 | 0.09 | 0.00 | 1.95 | 3.09 | 3.58 |

As it is obvious from the above explanation, by using a spiral gasket according to the present invention an extremely good gas sealing property is obtained and it is possible to deal with extremely slight leak represented by Clean Air Act in U.S. owing to the structure, in which only a hoop material is wound by at least five turns without filler material at the beginning and the end of winding at the inner and the outer periphery, respectively, more than the usual number of idle turns in the prior art and to the structure, in which there are disposed at least four portions fixed by welding for each of the beginning and the end of winding of the hoop material at positions dividing each of the peripheries with an equal interval.

What is claimed is:

1. In a spiral gasket in which a metal hoop material and a filler material are wound in a spiral configured winding, superposed on each other, the spiral gasket having an inner side and an outer side, wherein the improvement comprises only said metal hoop material being wound into at least five plies at each of a beginning of the winding on the inner side and an end of the winding on the outer side of said gasket, and said metal hoop material being fixed by welding at at least four positions whereat a periphery of the spiral gasket is divided into equal intervals at each of the beginning of the winding on the inner side and the end of the winding on the outer side of said gasket.

2. A spiral gasket according to claim 1, wherein said filler material protrudes from said metal hoop material by 0.24 to 0.5 mm.

3. A spiral gasket according to claim 2, wherein said filler material is made of flexible graphite tape.

4. A spiral gasket according to claim 1, wherein said metal hoop material and said filler material are formed into an approximate V-shaped cross-section and an angle $\alpha°$ measured at a vertex of the V-shaped cross-section and a radius of curvature (r mm) at the vertex of the metal hoop material are in a relation represented by $0.01(\alpha-10) \leq r \leq 0.01(\alpha+10)$.

5. A spiral gasket according to claim 4, wherein said angle $\alpha°$ is in a region between 40° and 80°.

6. A spiral gasket according to claim 4, wherein said filler material is made of flexible graphite tape.

7. A spiral gasket, comprising a thin metal ribbon wound into a generally spiral configuration having a beginning winding portion of at least five plies of metal ribbon, said at least five plies of said beginning winding portion being welded together at at least four locations, said at least four locations dividing an inner periphery of said beginning winding portion into approximately equal parts, an end winding portion of at least five plies of metal ribbon, said at least five plies of said end winding portion being welded together at at least four positions, said at least four positions dividing an outer periphery of said end winding portion into approximately equal parts, and a central winding portion between said beginning winding portion and said end winding portion, and a filler material positioned between adjacent plies in said central winding portion.

8. The spiral gasket according to claim 7, wherein said filler material protrudes from said metal ribbon in the range of 0.24 to 0.5 millimeters.

9. The spiral gasket according to claim 7, wherein said filler material is a flexible graphite tape.

10. The spiral gasket according to claim 7, wherein said at least four locations and said at least four positions are not radially aligned.

11. The spiral gasket according to claim 7, wherein said metal ribbon has a generally V-shape cross-sectional configuration having an angle $\alpha$ between sides of said V-shape configuration and a radius of curvature R at a vertex of said V-shape configuration, said angle $\alpha$ and said radius R having the relationship of $0.01(\alpha-10) \leq R \leq 0.01(\alpha+10)$.

* * * * *